(12) United States Patent
Kiko et al.

(10) Patent No.: US 8,573,994 B2
(45) Date of Patent: Nov. 5, 2013

(54) CONNECTOR HANDLE FOR AN ELECTRIC VEHICLE BATTERY CHARGER

(71) Applicant: Delphi Technologies, Inc., Troy, MI (US)

(72) Inventors: Jeffrey S. Kiko, Kent, OH (US); Joseph Matthew Senk, Cortland, OH (US); Brian D. Pasha, Cortland, OH (US); Steven William Marzo, Cortland, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 13/874,688

(22) Filed: May 1, 2013

(65) Prior Publication Data

US 2013/0241484 A1 Sep. 19, 2013

Related U.S. Application Data

(63) Continuation of application No. 12/950,298, filed on Nov. 19, 2010.

(51) Int. Cl.
*H01R 29/00* (2006.01)

(52) U.S. Cl.
USPC ............ 439/188; 439/372; 439/489; 320/109

(58) Field of Classification Search
USPC ........... 439/188, 310, 372, 489, 911; 320/109
See application file for complete search history.

(56) References Cited

U.S. PATENT DOCUMENTS

| | | | |
|---|---|---|---|
| 4,109,193 A * | 8/1978 | Schultheis | 320/109 |
| 4,452,501 A * | 6/1984 | Gladd et al. | 439/345 |
| 5,145,402 A | 9/1992 | Plyler et al. | |
| 5,220,268 A | 6/1993 | Rose et al. | |
| 5,350,312 A | 9/1994 | Kuno et al. | |
| 5,385,480 A * | 1/1995 | Hoffman | 439/310 |
| 5,413,493 A * | 5/1995 | Hoffman | 439/188 |
| 5,433,623 A * | 7/1995 | Wakata et al. | 439/310 |
| 5,458,496 A * | 10/1995 | Itou et al. | 439/34 |
| 5,545,049 A * | 8/1996 | Hasegawa et al. | 439/310 |
| 5,575,675 A | 11/1996 | Endo et al. | |
| 5,577,920 A * | 11/1996 | Itou et al. | 439/34 |
| 5,584,715 A * | 12/1996 | Ehrenfels | 439/222 |
| 5,614,808 A * | 3/1997 | Konoya et al. | 320/109 |

(Continued)

FOREIGN PATENT DOCUMENTS

EP 1 892 156 2/2008

OTHER PUBLICATIONS

SAE J1772 Affirmation Ballot, Sep. 12, 2004.

*Primary Examiner* — Amy Cohen Johnson
*Assistant Examiner* — Vladimir Imas
(74) *Attorney, Agent, or Firm* — Robert J. Myers

(57) ABSTRACT

A connector handle for an electric vehicle battery charger is provided. The connector handle includes a latch that is operable to a locked position and an unlocked position. The connector handle also includes an electric circuit configured to provide an enable indication and a disable indication. The connector handle also includes an actuator button moveable to a first position where the latch is in the locked position and the electric circuit provides the enable indication, a second position where the latch is in the locked position and the electric circuit provides the disable indication, and a third position where the latch is in the unlocked position and the electric circuit provides the disable indication.

9 Claims, 10 Drawing Sheets

(56) References Cited

U.S. PATENT DOCUMENTS

| | | | |
|---|---|---|---|
| 5,637,977 A * | 6/1997 | Saito et al. .................... 320/109 |
| 5,664,960 A | 9/1997 | Fukushima |
| 5,674,086 A | 10/1997 | Hashizawa et al. |
| 5,676,560 A * | 10/1997 | Endo et al. .................... 439/310 |
| 5,751,135 A * | 5/1998 | Fukushima et al. ......... 320/107 |
| 5,758,414 A * | 6/1998 | Ehrenfels ........................ 29/857 |
| 5,803,760 A * | 9/1998 | Ito et al. ........................ 439/310 |
| 5,816,643 A * | 10/1998 | Itou et al. .................... 296/97.22 |
| 5,906,500 A | 5/1999 | Kakuta et al. |
| 5,909,100 A * | 6/1999 | Watanabe et al. ............ 320/108 |
| 6,069,559 A | 5/2000 | Davis et al. |
| 6,123,569 A * | 9/2000 | Fukushima et al. ......... 439/456 |
| 6,203,355 B1 * | 3/2001 | Neblett et al. ................ 439/372 |
| 6,225,153 B1 * | 5/2001 | Neblett et al. ................ 438/188 |
| 6,310,465 B2 | 10/2001 | Najima |
| 6,371,768 B1 * | 4/2002 | Neblett et al. ................ 439/34 |
| 6,428,341 B2 | 8/2002 | Kinezuka et al. |
| 6,459,234 B2 * | 10/2002 | Kajiura ........................ 320/109 |
| 7,094,081 B1 | 8/2006 | Senk et al. |
| 7,201,587 B1 | 4/2007 | Eichorn et al. |
| 7,241,156 B1 | 7/2007 | Margrave et al. |
| 7,868,251 B2 | 1/2011 | Gladd et al. |
| 7,878,866 B1 | 2/2011 | Kwasny et al. |
| 7,963,793 B2 * | 6/2011 | Poulin et al. .................. 439/352 |
| 7,999,665 B2 * | 8/2011 | Chander et al. ............... 340/455 |
| 8,016,607 B2 * | 9/2011 | Brown, II ...................... 439/353 |
| 8,025,526 B1 * | 9/2011 | Tormey et al. ................ 439/528 |
| 8,120,310 B2 * | 2/2012 | Littrell et al. ................. 320/104 |
| 8,125,183 B2 * | 2/2012 | Katsunaga .................... 320/109 |
| 8,197,277 B1 | 6/2012 | Teichmann |
| 8,206,171 B2 * | 6/2012 | Osawa et al. ................. 439/352 |
| 8,206,184 B2 | 6/2012 | Kwasny et al. |
| 8,251,734 B2 * | 8/2012 | Katagiri et al. ............... 439/352 |
| D669,033 S | 10/2012 | Senk et al. |
| 8,344,692 B2 * | 1/2013 | Sakurai ........................ 320/109 |
| 8,368,350 B2 * | 2/2013 | Iwanaga et al. ............... 320/109 |
| 8,439,699 B2 * | 5/2013 | Ohmura ........................ 439/372 |
| 2011/0070758 A1 * | 3/2011 | Poulin et al. .................. 439/153 |
| 2012/0129378 A1 | 5/2012 | Kiko et al. |

* cited by examiner

1. HANDLE NOT CONNECTED TO VEHICLE INLET CONNECTOR

| ACTUATOR BUTTON POSITION | BATTERY CHARGING STATE | LED STATE | PRIMARY OUTPUT RESISTANCE | LATCH STATE | THERMAL CUTOUT DEVICE |
|---|---|---|---|---|---|
| FIRST POSITION | NOT CHARGING | OFF | LOW | LOCKED | CLOSED |
| SECOND POSITION | NOT CHARGING | ON | HIGH | LOCKED | CLOSED |
| THIRD POSITION | NOT CHARGING | ON | HIGH | UNLOCKED | CLOSED |

FIG. 7A

2. HANDLE CONNECTED TO VEHICLE INLET CONNECTOR

| ACTUATOR BUTTON POSITION | BATTERY CHARGING STATE | LED STATE | PRIMARY OUTPUT RESISTANCE | LATCH STATE | THERMAL CUTOUT DEVICE |
|---|---|---|---|---|---|
| FIRST POSITION | CHARGING | OFF | LOW | LOCKED | CLOSED |
| SECOND POSITION | NOT CHARGING | ON | HIGH | LOCKED | CLOSED |
| THIRD POSITION | NOT CHARGING | ON | HIGH | UNLOCKED | CLOSED |

FIG. 7B

3. TEMPERATURE OF HANDLE > 105° F

| ACTUATOR BUTTON POSITION | BATTERY CHARGING STATE | LED STATE | PRIMARY OUTPUT RESISTANCE | LATCH STATE | THERMAL CUTOUT DEVICE |
|---|---|---|---|---|---|
| DO NOT CARE | DO NOT CARE | ON | HIGH | DO NOT CARE | OPEN |

FIG. 7C

CONNECTOR HANDLE FOR AN ELECTRIC VEHICLE BATTERY CHARGER

CROSS-REFERENCE TO RELATED APPLICATION

This application is a continuation of U.S. application Ser. No. 12/950,298 filed Nov. 19, 2011, entitled "BATTERY CHARGER HAVING NON-CONTACT ELECTRICAL SWITCH," the entire disclosure of which is hereby incorporated herein by reference.

TECHNICAL FIELD OF INVENTION

This disclosure generally relates to an electrical connector assembly, and more particularly to a connector handle for an electric vehicle battery charger.

BACKGROUND OF INVENTION

It is known, referring to FIG. 1, to electrically charge a battery of an electric vehicle (2) using a battery charging system (3) that is connected to the vehicle (2). The charging system (3) includes a control box (4) connected to a vehicle coupler (5). The vehicle coupler (5) is attached to the vehicle (2) to charge the battery. The vehicle coupler includes a mechanical switch (6). When the mechanical switch (6) is closed, an electrical output changes state so that the vehicle (2) senses the presence of the vehicle coupler (5) and enables charging of the battery by the system (3). When a latch mechanism (not shown) is operated by a pulling of another trigger (not shown) or a pressing of a button (not shown), mechanical switch (6) is cycled, that is, mechanical switch (6) moves from a closed to an open position. When mechanical switch (6) is released, it returns back to its closed position. The contacts (not shown) of the mechanical switch (6) are subject to wear and may actually wear out with repeated use of the mechanical switch (6) that may lead to a decreased product life and require early undesired servicing of the mechanical switch (6). Additionally, a potentially unsafe situation may develop if the vehicle coupler (5) is disconnected from the vehicle (2) by an operator of the system (3) while the battery is simultaneously being electrically charged, otherwise known as a hot disconnect of the vehicle coupler (5). The electric circuit as shown in prior art FIG. 1 is described in a SAE J-1772 standard for hybrid electric vehicles and electric vehicles.

Hybrid electric vehicles and electric vehicles are gaining in popularity with consumers in the marketplace. And because these vehicles may use little or no hydrocarbon fuel, they rely more heavily on the energy provided by the vehicle's battery to power a vehicle along a road. As an energy charge state of the battery of the electric vehicle decreases, the battery may need to be electrically recharged back to a fully charged energy state. As electric vehicles become more prominent, the need for battery charging systems to recharge batteries for these vehicles increases. It is desirable to provide a battery charging system that eliminates the shortcomings of the prior art as shown in FIG. 1. It is also desirable to recharge a battery with a system that provides increased safety and convenience for a user of the battery charging system.

Accordingly, what is needed is a reliable battery charging system that provides increased safety and convenience for a human operator of the battery charging system.

SUMMARY OF THE INVENTION

In accordance with one embodiment, a connector handle for an electric vehicle battery charger is provided. The connector handle is configured to electrically connect and mechanically lock the connector handle to an electric vehicle. The connector handle includes a latch operable to a locked position where the connector handle is locked to the vehicle and an unlocked position where the connector handle is not locked to the vehicle. The connector handle also includes an electric circuit configured to provide an enable indication that indicates that electrical power to charge a battery of the vehicle should be supplied to the connector handle. The electric circuit also provides a disable indication that indicates electrical power should not be supplied to the connector handle. The connector handle also includes an actuator button in operable communication with the latch and the electric circuit. The actuator button is moveable to a first position where the latch is in the locked position and the electric circuit provides the enable indication. The actuator button is also moveable to a second position where the latch is in the locked position and the electric circuit provides the disable indication. The actuator button is also moveable to a third position where the latch is in the unlocked position and the electric circuit provides the disable indication.

Further features and advantages will appear more clearly on a reading of the following detailed description of the preferred embodiment, which is given by way of non-limiting example only and with reference to the accompanying drawings.

BRIEF DESCRIPTION OF DRAWINGS

This invention will be further described with reference to the accompanying drawings in which:

FIGS. 7A-7C are tables showing the operational state of elements of the battery charger based on the position of the actuator button, the connection status of the connector handle, and the temperature of the connector handle.

DETAILED DESCRIPTION

Figure 2:
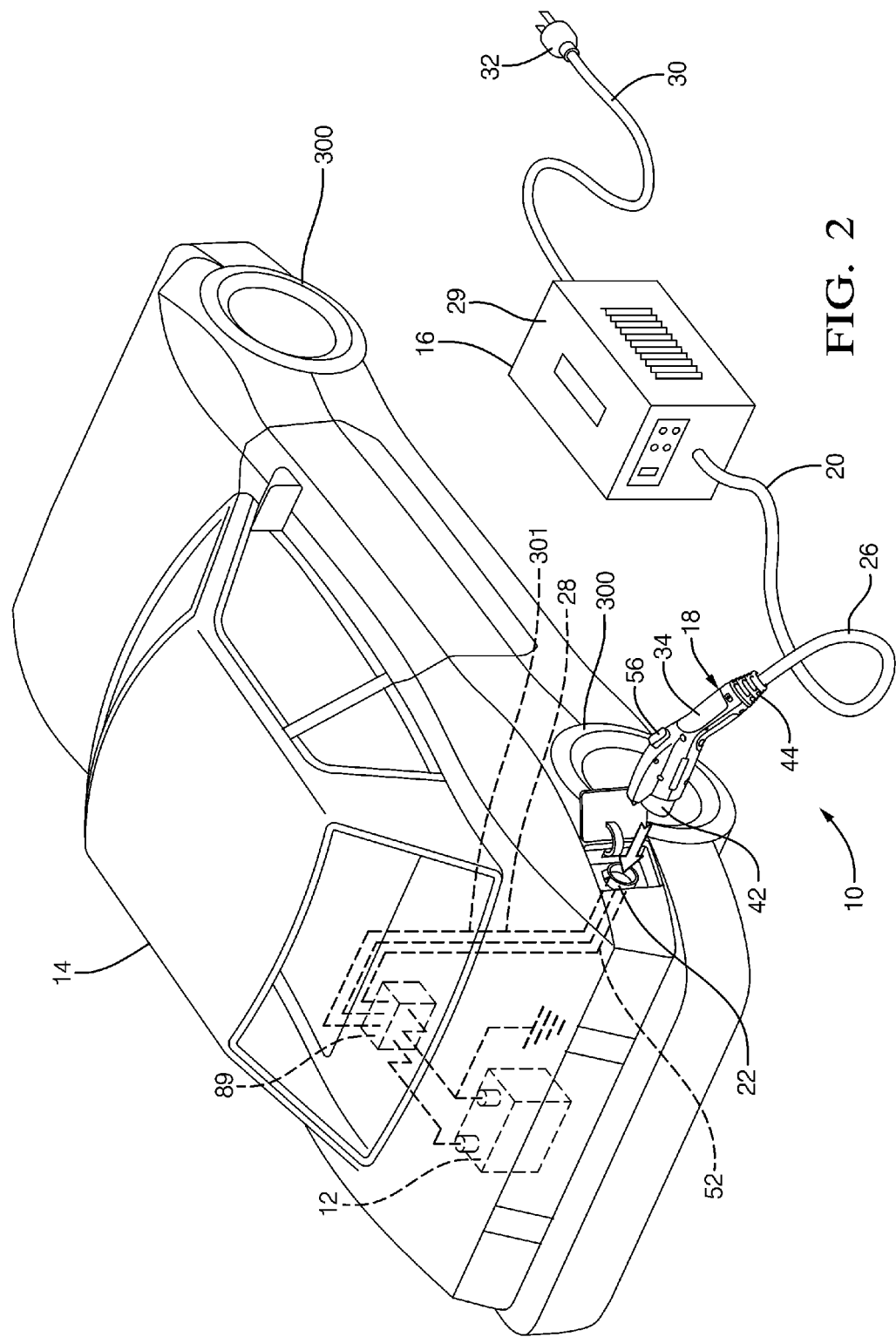
FIG. 2 is perspective view of a vehicle and a battery charger.

FIG. 2 illustrates a non-limiting example of a vehicle 14 and a battery charger 10. The vehicle 14 may be an electric vehicle or hybrid vehicle equipped with an electric motor (not shown) to power one or more of the wheels 300 of the vehicle 14. The electric motor is powered by a battery 12. The battery charger 10 is equipped with a connector handle 18 to electrically and mechanically connect the battery charger 10 to the vehicle 14. The battery charger 10 includes a charging station 16 for supplying electrical power to the connector handle 18.

The charging station 16 may receive electrical power from a 120VACv or 240VAC source (not shown) via an electric plug 32. A charge controller 89, located in the vehicle 14, provides signals 301 to the charging station 16 to indicate whether or not the charging station 16 should supply electrical power to the connector handle 18. The charge controller 89 signals for electrical power only when the connector handle 18 is mechanically locked to the vehicle 14 in order to reduce the risk of an operator being inadvertently shocked by the electrical power being supplied to the end of the connector handle 18.

Figure 3:
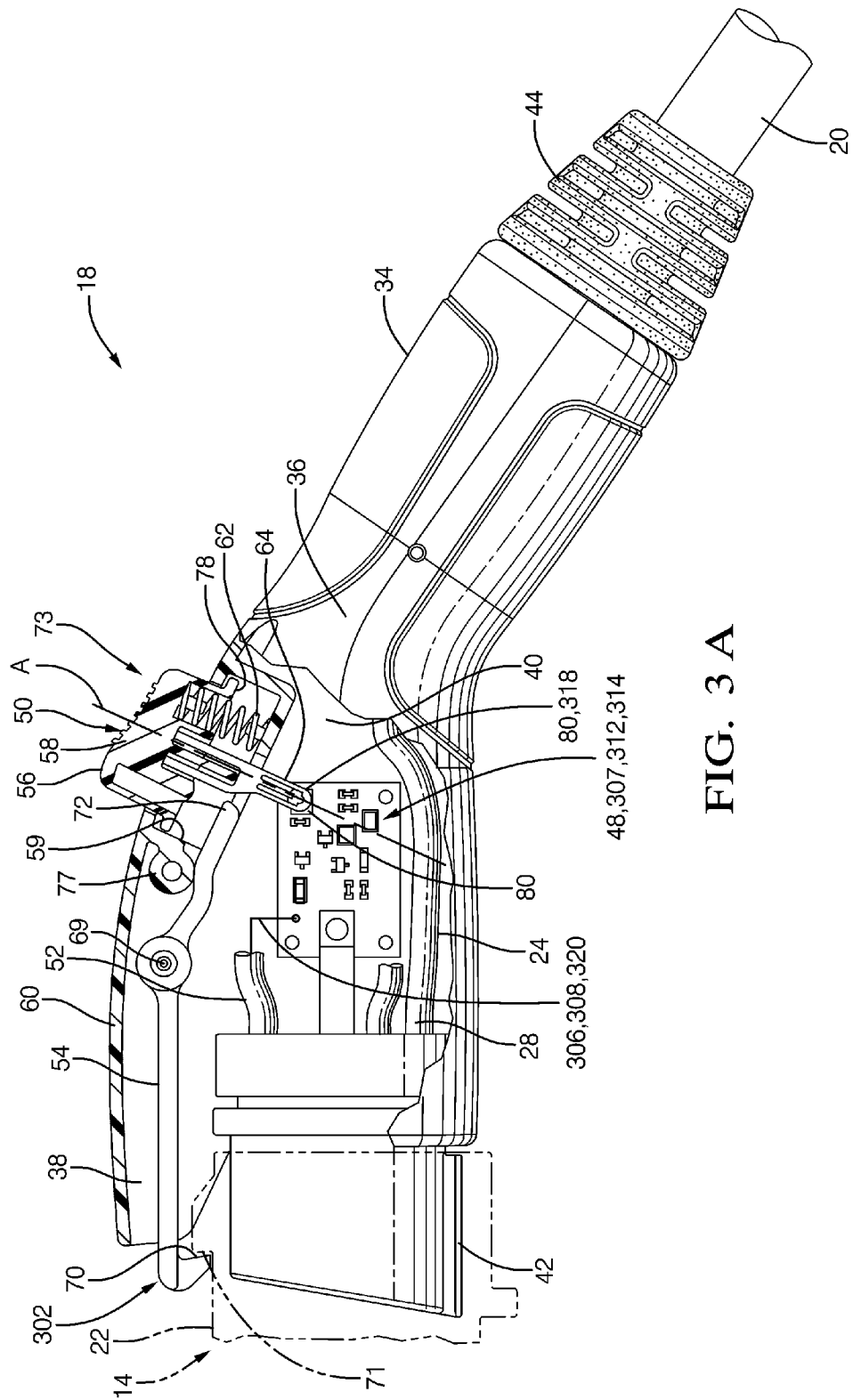
FIG. 3A is a partial cut-away view of a connector handle of the battery charger with an actuator button of the connector handle in a first position.
FIG. 3B is a partial cut-away view of the connector handle with the actuator button in a second position.
FIG. 3C is a partial cut-away view of the connector handle with the actuator button in a third position.
Figure 3:
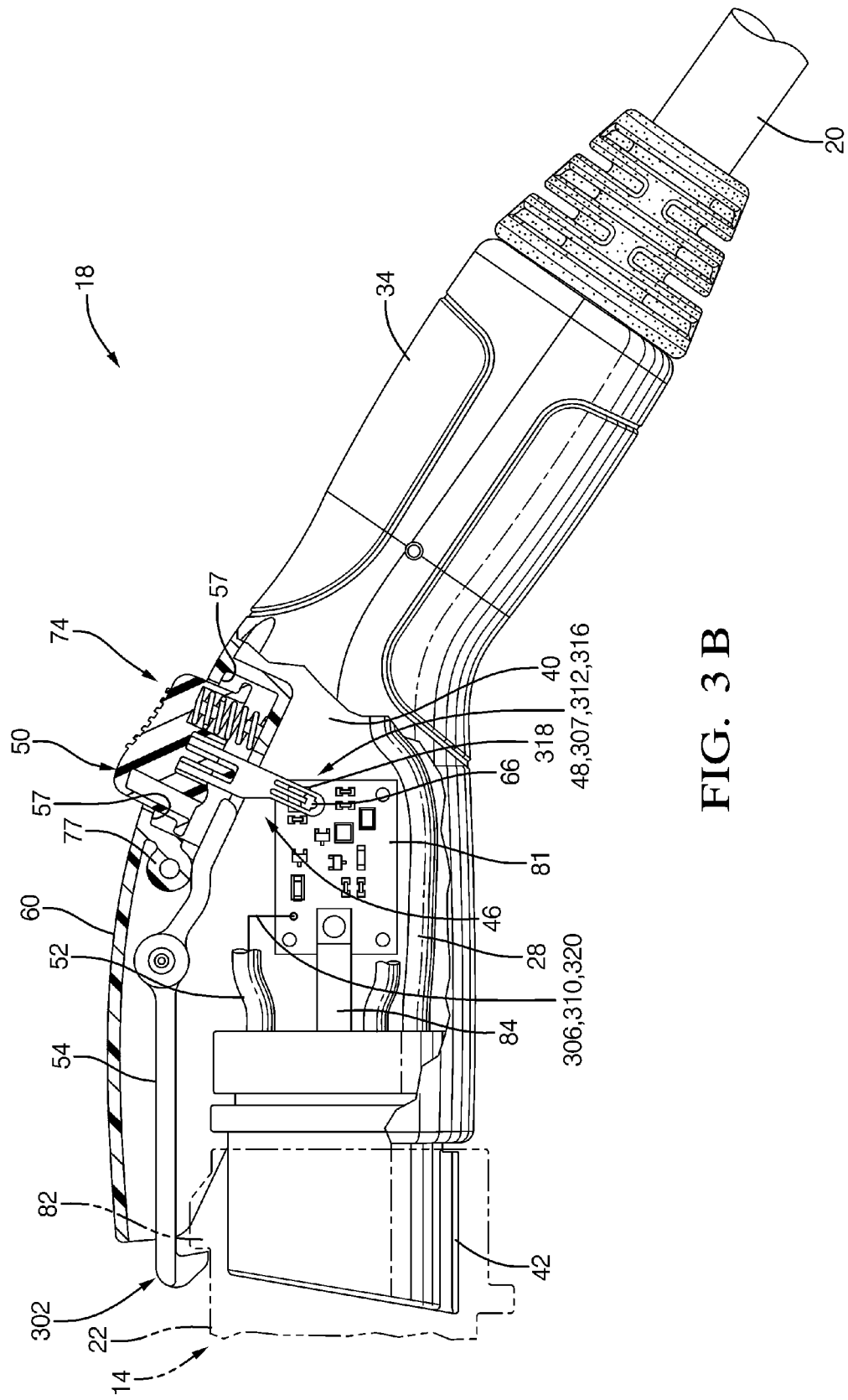
Figure 3C:
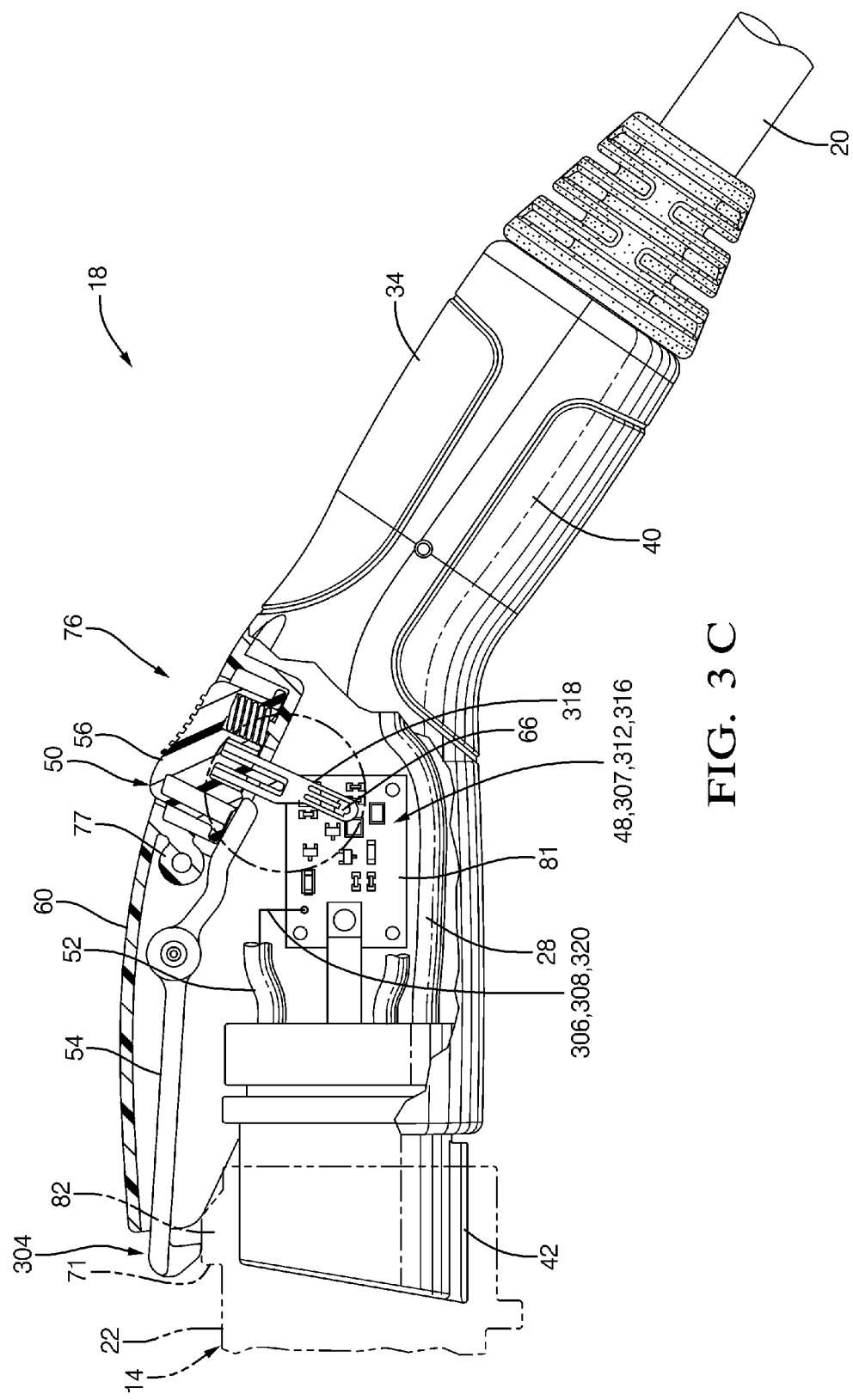

FIGS. 3A-C illustrate a non-limiting example of the connector handle 18. The connector handle 18 includes a latch 54 operable to a locked position 302 where the connector handle is locked to the vehicle 14 and an unlocked position 304 where the connector handle is not locked to the vehicle. The latch 54 includes a hook portion 70 that engages a shoulder 71 of a vehicle inlet connector 22 when the latch is in the locked position 302. It is noted here that the locked position 302 is a singular position for the latch 54 such that the hook portion 70 fully engages the shoulder 71. The latch 54 is preferably made of a solid, dielectric material with sufficient strength to lock the connector handle 18 to the vehicle 14. For example, the latch 54 may be made from plastic. The latch 54 is attached to a handle housing 34 with a fastener 69 that allows the latch 54 to rotate from locked position 302 to the unlocked position 304. The handle housing 34 may be made from plastic, and the fastener 69 may be a metal screw or rivet. A boss 77 of the handle housing 34 prevents the latch 54 from rotating past the locked position 302 when the connector handle 18 is not connected to the vehicle 14.

An electric circuit 48 is contained within the handle housing 34. The electric circuit 48 is electrically connected to the charge controller 89 via electrical connection 52. The electric circuit 48 is configured to provide a plurality of indications 306 to the charge controller 89 (shown in FIG. 2) to indicate whether or not electrical power should be supplied to the connector handle 18. The indications 306 include an enable indication 308 that indicates that electrical power to charge the battery 12 of the vehicle 14 should be supplied to the connector handle 18 and a disable indication 310 that indicates electrical power should not be supplied to the connector handle 18. The indications 306 from the electric circuit 48 may be a plurality of resistance values 307 of a resistance 312 of the electric circuit 48 where the enable indication 308 is indicated by a first resistance value 314 and the disable indication 310 is indicated by a second resistance value 316. The first resistance value 314 is distinct from the second resistance value 316. The electric circuit 48 may include a magnetic sensing device 318 configured to change the resistance 312 from the first resistance value 314 to the second resistance value 316 when an actuator button 56 is moved from a first position 73 to a second position 74. The magnetic sensing device 318 may be a Hall effect sensor 80 (shown in FIG. 5) or a reed switch 211 (shown in FIG. 8). The use of the magnetic sensing device 318 eliminates the need for the actuator button 56 to physically contact the electric circuit 48, thus improving the wear resistance and reliability of the electric circuit 48.

The indications 306 from the electric circuit 48 may further include an over-temperature indication 320 that indicates the temperature of the connector handle 18 has exceeded a threshold value. The over-temperature indication 320 may be used by the charge controller 89 to identify the need to stop the supply of electrical power to the connector handle 18 in order to prevent thermal damage that may occur to the connector handle. Over-heating of the connector handle 18 may occur if the electrical resistance between the connector handle and vehicle 14 inadvertently rises above design specifications. The over-temperature indication 320 may be a third resistance value of the plurality of resistance values 312. The electric circuit 48 may include a thermal cutout device 85 (shown in FIG. 5) which is configured to change the resistance 312 to the third resistance value when the temperature of the connector handle 18 exceeds the threshold value. The threshold value may be empirically determined such that thermal damage does not occur. For example, the threshold may be set at 105° C. such that plastic in the connector handle 18 does not deform or melt.

The actuator button 56 is partially housed within the handle housing 34. The actuator button 56 is retained to the handle housing 34 by flanges 57. The actuator button 56 may be made of a solid, dielectric material such as plastic. A spring 62 urges the actuator button 56 to load up against the flanges 57.

The actuator button 56 is in operable communication with the latch 54 and the electric circuit 48 by way of the position of the actuator button. The actuator button 56 is moveable to a first position 73 where the latch 54 is in the locked position 302 and the electric circuit 48 provides the enable indication 308; a second position 74 where the latch 54 is in the locked position 302 and the electric circuit 48 provides the disable indication 310; and a third position 76 where the latch 54 is the unlocked position 304 and the electric circuit 48 provides the disable indication 310. The actuator button 56 moves the latch 54 to the unlocked position 304 when the actuator button is moved from the second position 74 to the third position 76. The actuator button 56 passes through the second position 74 when moved from the first position 73 to the third position 76. It is noted here that the disable indication 310 is provided by the electric circuit 48 while the latch is in the locked position 302 (I.e. when the actuator button is in the second position), thus reducing the risk of an operator being inadvertently shocked by electrical power that is still being supplied to the end of the connector handle 18 when the operator disconnects the connector handle 18.

The connector handle 18 is configured such that the actuator button 56 may remain in the first position 73 while the connector handle 18 is being electrically connected and mechanically locked to the vehicle 14. This configuration allows for an operator to lock the connector handle 18 to the vehicle 14 without having to move the actuator button 56.

A powertrain of a vehicle is a group of components in the vehicle that generate power and deliver this power through the wheels of the vehicle to a road surface. A hybrid electric vehicle and an electrical vehicle each use a battery to power the powertrain of their respective vehicles. A hybrid electrical vehicle uses a hydrocarbon fuel engine in combination with a battery disposed on the vehicle to power the powertrain of a vehicle. An electric vehicle powers the powertrain solely by using energy from a battery. The battery of the hybrid electric vehicle and the electric vehicle may include a plurality of batteries connected in series or parallel connection to form a single battery. As the vehicle is driven, or otherwise used by a human operator of the vehicle such as when powering the radio or windshield wipers apart from powering the powertrain, the electrical charge on the battery may decrease such that the battery needs to be electrically recharged back to a fully charged electrical state. Recharging a battery may be accomplished using an electrical charging system that connects with the vehicle. The charging assembly supplies the electrical charge to fill the battery with an electrical charge in a similar manner to a fuel pump that pumps hydrocarbon fuel into a fuel tank to supply an engine that operates using hydrocarbon fuel. A portion of the charging assembly may be connected with the electric vehicle and another portion of the assembly may be connected to an electrical power source to allow the charging assembly to electrically charge the battery of the vehicle.

According to FIG. 2, a battery charger 10 is presented to electrically charge a battery 12 of an electric vehicle 14. Alternately, the vehicle may be a hybrid electrical vehicle or any other type of motorized transportation where a battery needs to be electrically charged. The battery charger 10 includes charging station 16, a connector handle 18, and a cord, or cable 20 that electrically links charging station 16 with connector handle 18. The battery charger 10 is of a size suitable to package in electric vehicle 14 for storage when not in use. For example, the battery charger 10 may be stored in a trunk or an interior space of vehicle 14. Thus, the battery charger 10 may be portable with vehicle 14. The battery charger 10 may be removed from storage in vehicle 14 when battery 12 of vehicle 14 requires electrical charging of battery 12 back to a fully charged electrical state.

Connector handle 18, as illustrated in FIG. 2, is being coupled to a vehicle inlet receptacle, connection, or vehicle inlet connector 22 disposed on vehicle 14. Vehicle inlet connector 22 passes electrical charge from the battery charger 10 to electrically charge battery 12. Vehicle inlet connector 22 is disposed at a rear exterior portion of vehicle 14 at a height suitable to allow connector handle 18 to be easily mated to vehicle inlet connector 22. Alternately, the vehicle inlet connection may be disposed at any interior or exterior location on the vehicle. Locating the vehicle inlet connection away from a rear portion of the electric vehicle may assist vehicle operators and other consumers to identify the vehicle as an electric vehicle in contrast to a vehicle that operates on hydrocarbon fuel that has typically and historically been fueled in the rear portion of the vehicle.

Referring to FIGS. 2-3, connector handle 18 contains one or more wire conductors 24 that may provide uni-directional or bi-directional flow of electrical signals between connector handle 18 and vehicle 14. Some of the wire conductors 24 are routed through cable 20 to charging station 16. At least one of the wire conductors 28 of the one or more wire conductors 24 carries a power signal to charge battery 12 of vehicle 14. Wire conductors routed in cable 20 may be enclosed with an insulative, protective outer cover 26. For example, the insulative outer cover may be formed of a plastic sheath or formed using electrical tape wound about the wire conductors. Wire conductors 28 carrying power signals are sufficiently sized to carry a current or voltage load to effectively charge battery 12 of vehicle 14. In one embodiment, two wire conductors carrying power signals are routed through cable 20 and connector handle 18 into vehicle 14. Other wire conductors in cable 20 routed through connector handle 18 may carry electrical control signals that communicate between charging station 16 and a charge controller 89 to facilitate electrical charging of battery 12. For example, one such control signal is a pilot signal that the controller uses to handshake, and communicate with the charging station. Charge controller 89 manages the electrical charging of battery 12. Charge controller 89 receives current through the wire conductors 28 carrying power signals from connector handle 18 and may select to not transmit these signals to battery 12. Charge controller 89 may further process, or filter these power signals before supplying the filtered power signals to battery 12. Alternately, the vehicle may use other vehicle-side electrical circuit configurations and charge controller types that are effective to supply the electrical energy from the one or more power signals using the other control signals routed through the connector handle 18 to the power station to electrically charge the battery of the vehicle. These other configurations are left for contemplation by the artesian.

Charging station 16 includes a housing 29. Housing 29 may be constructed of solid material such as metal or plastic. Electrical circuits that form the at least one power signals carried on wire conductors 28 in cable 20 are disposed in housing 29 and receive the voltage and/or the current from a power source (not shown). Charging station 16 receives power from the power source into housing 29 through an electrical cord 30. An electric plug 32 of cord 30 is received by a 120 volt alternating current (AC) receptacle outlet. This voltage level is typical of what may be found when connected to an AC electrical outlet in a garage of a vehicle owner in the United States. Alternately, the charging station may have a power source with 240 volts of alternating current. Using a charging station that is powered by a power source of 240 volts AC provides more current or voltage load to charge a battery that results in charging, or recharging a battery in a less amount of time than battery charger 10 that uses a power source of 120 volts AC. Alternately, a battery charging station may be provided that requires connection to a power source that is a voltage level other than 120 or 240 volts AC including power sources that operate on direct current (DC).

Connector handle 18 includes a handle housing 34 formed from a left portion 36 and a right portion 38. Portions 36, 38 are mates, and when assembled together, define a space, or passage 40 through connector handle 18. Portions are 36, 38 are formed of a molded material such as plastic. Preferably, connector handle 18 is formed of a flame retardant material that may be approved and listed by Underwriters Laboratory (UL). Alternately, the body of the charge coupling handle may be integrally formed. Portions 36, 38 may be fastened together with fasteners such as screws, rivets, an adhesive, and the like. In another embodiment, seven screws attach the left and the right portion together.

Referring to FIG. 3A-3C, connector handle 18 includes a handle connector 42. Handle connector 42 is attached to one end of connector handle 18 adjacent passage 40. Handle connector 42 is suitable to mate with vehicle inlet connector 22 which receives handle connector 42. Handle connector 42 is a male connector and vehicle inlet connector 22 is a corresponding female connector. Alternately, the connections means may be a female connector and vehicle inlet connector may be a male connector. Preferably, handle connector 42 is formed of a connector that is a SAE J-1772 approved connector. Alternately, the handle connector may be of any type connector that has a corresponding mating vehicle inlet connector that is attachable to the body of the handle. As previously described herein, connector handle 18 is electrically tethered to charging station 16 by cable 20. Wire conductors 24 are received in passage 40 at another end of connector handle 18 remote from handle connector 42. Wire conductors 28 carrying power signals are routed through passage 40 and received into handle connector 42. Handle connector 42 and passage 40 are suitable to route any electrical signal through wire conductors 24 in connector handle 18 needed to charge battery 12 of vehicle 14. A grommet 44 is attached to an end of connector handle 18 that receives cable 20. Grommet 44 is effective to provide strain relief for cable 20 into connector handle 18. Preferably, grommet 44 and handle connector 42 are secured in handle housing 34 when portions 36, 38 are joined together.

The connector handle 18 mechanically and electrically couples and decouples charging station 16 with vehicle 14. The connector handle 18 includes an electric circuit 48 and a mechanical latch 54 that are operatively associated with an activator 50. The electric circuit 48 is disposed on a printed circuit board (PCB) 81 in connector handle 18 and includes a wire conductor that serves as an electrical output for electric circuit 48, or an electrical connection 52 that communicates with handle connector 42 to vehicle 14 when handle connector 42 is connected to vehicle inlet connector 22. Latch 54 securely mechanically locks connector handle 18 to vehicle 14 passively when connector handle 18 is manually attached to vehicle 14 by a human operator. Activator 50 in combination with electric circuit 48 is adapted to alter the resistance state of electrical connection 52 between a high and a low resistance state. Preferably, the high resistance state is about 480 ohms and the low resistance state is about 150 ohms. Electrical connection 52 is provided a 5 VDC supply voltage through vehicle 14 when handle connector 42 of connector handle 18 is connected to vehicle inlet connector 22. Alternately, a different level of supply voltage may be utilized. Activator 50 is movable by the operator from a first position 73 to a second position 74 and a third position 76. The latch 54 operates independently of the state of activator 50 when connector handle 18 is being manually attached to vehicle inlet connector 22 but being mechanically released from vehicle inlet connector 22 by activator 50 when it is moved to its third position 76. The electric circuit 48 is associated with activator 50 to break electrical connection 52, or put electrical connection 52 in a high resistance state, when activator 50 is moved to the second position 74 before releasing latch 54 at the third position 76. The electrical connection 52 is still physically electrically connected to vehicle inlet connector 22, but electrical connection is broken by being altered to a high resistance state. In this manner, electric circuit 48 combines with activator 50 to affect a resistance state of electrical connection 52 to vehicle 14 when connector handle 18 is connected to vehicle 14, and vehicle 14 responds back to battery charger 10 so that battery charger 10 electrically manages, or controls the flow of electrical current through wire conductors 28 carrying power signals in connector handle 18 and into vehicle 14 to allow electrical charging of battery 12 apart from independently mechanically managing a connection state of handle connector 42 in communication to vehicle inlet connector 22. Unplugging of electrical connection 52 from vehicle inlet connector 22 may not easily occur until electrical connection 52 is electrically broken, or in a high resistance state as seen by charge controller 89 of vehicle 14.

Referring to FIGS. 3A-3C, activator 50 is an actuator button 56. The actuator button 56 is disposed along a longitudinal axis A as best illustrated in FIG. 3A. The actuator button 56 is mounted to handle housing 34 of connector handle 18 so that a head portion 58 of actuator button 56 is accessible to a human operator (not shown) of connector handle 18. The actuator button 56 is fitted into an aperture 59 in connector handle 18. Flanges 57 surround the aperture 59 so that flanges 57 provide an interference fit for actuator button 56 in combination with a force supplied by biasing means, or spring 62. Spring 62 is effective to automatically move activator 50 back to its deactivated state when released by the operator. Preferably, connector handle 18 is ergonomically designed so as to be grasped with a hand of the operator of battery charger 10. One such handle is described in U.S. application Ser. No. 29/376,111 and is incorporated by reference herein. Alternately, push-button portion may be disposed anywhere along the external surface of connector handle 18.

Figure 4:
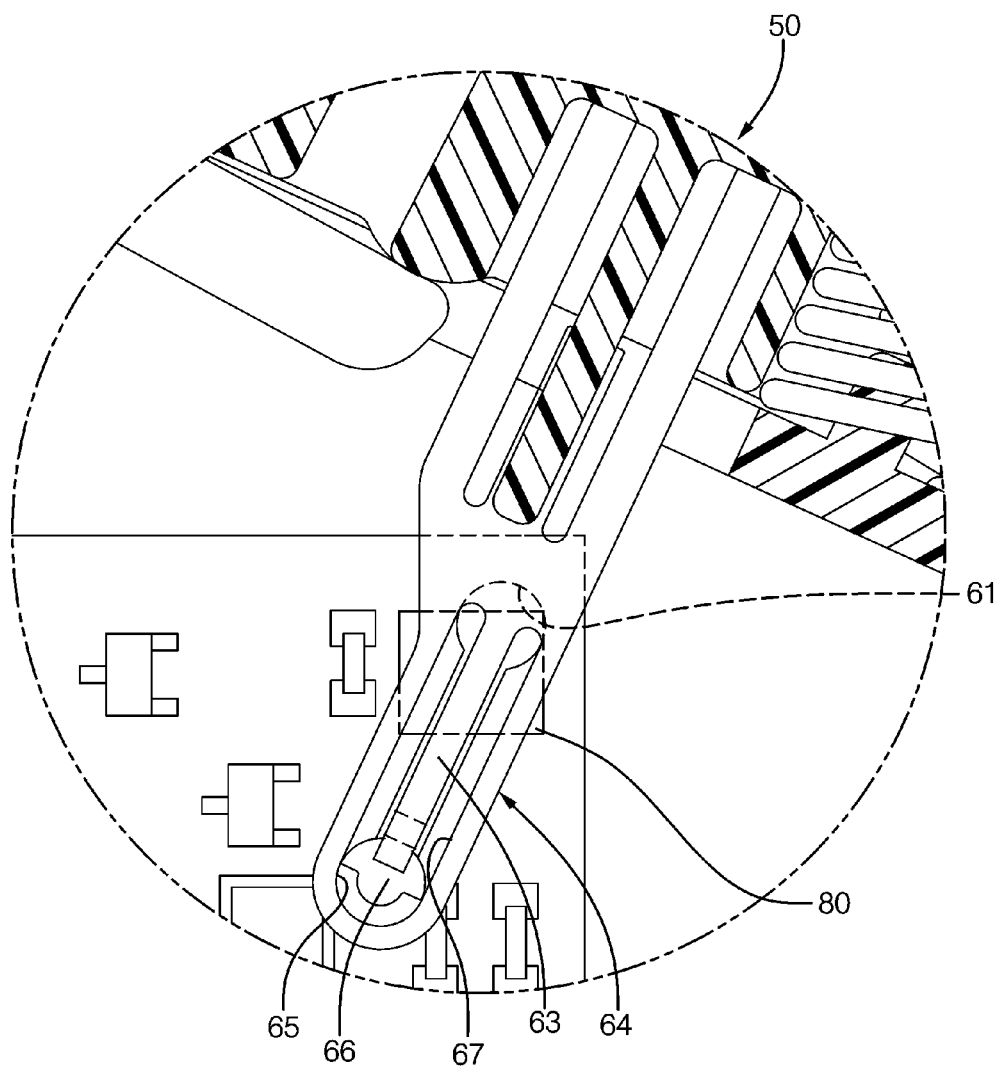
FIG. 4 is a magnified view of an extended portion of the actuator button.

Actuator button 56 includes a spring 62 to bias head portion 58 and an extending portion 64 that depends axially away from head portion 58 adjacent spring 62. Actuator button 56 is constructed of a rigid, dielectric material such as plastic. Extending portion 64 includes a magnet 66 that is secured in extending portion 64. Preferably, magnet 66 is cylindrical. Referring to FIG. 4, magnet 66 is secured in extending portion 64 that includes a magnet retainer 67. Magnet retainer 67 receives magnet 66 at a start position 61 being installed with a tool (not shown) that allows placement of magnet 66 into start position 61 of retainer 67 so that magnet 66 is urged to slide down a ramp 63 using the tool into a locked position 65 in retainer 67. The tool used to install the magnet may be similar to a terminal pick having a pointed end having a custom form used to capture magnet 66 on its cylindrical axis and prevents magnet 66 from tipping over during installation in retainer 67. When head portion 58 is in a rest position as best illustrated in FIG. 3A, magnet 66 is proximate and overlying electric circuit 48. Extending portion 64 moves in a forward axial direction of axis A toward passage 40 when head portion 58 is depressed by the operator. Correspondingly, referring to FIGS. 3B and 3C, magnet 66 travels to move away from electric circuit 48. Extending portion 64 moves in a rearward axial direction of axis A away and outwardly from passage 40 when push-button portion is released by the operator.

The first position, or rest position of actuator button 56, is best illustrated in FIG. 3A. The first position 73 of actuator button 56 occurs when actuator button 56 is not pressed, or depressed by the operator of connector handle 18. Magnet 66 in first position 73 of head portion 58 supplies magnetic flux to electric circuit 48. Spring 62 provides bias to actuator button 56 to position head portion 58 above external surface 60 of connector handle 18. A first mode of actuator button 56 is actuator button 56 being activated, or depressed in an axial first travel direction by the operator to first position activated state, or second position 74 as best illustrated in FIG. 3B. Second position 74 is also a partial depress position for actuator button 56. Second position 74 axially submerges a section of head portion 58 below external surface 60. Magnet 66 is moved remotely away from being over magnetic sensing device 318 in second position 74. For example, the first travel direction of head portion 58 to the second position 74 from first position 73 may be a distance of 6 millimeters from first position 73 of actuator button 56. A second mode of actuator button 56 is actuator button 56 being activated, or depressed in an axial second travel direction further from the first travel direction by the operator to a second position activation state, or a third position 76 as best illustrated in FIG. 3C. Third position 76 is a complete depress position of actuator button 56. Magnet 66 in third position 76 of head portion 58 is moved even more remotely away from being over magnetic sensing device 318 than when in second position 74. Third position 76 axially substantially submerges head portion 58 below external surface 60 so that a surface of head portion 58 is about level with external surface 60. For example, a distance of the second travel direction may be 9 millimeters to third position 76 from first position 73 of actuator button 56. Third position 76 has a length of travel along axis A that is greater than a length of travel of second position 74 where the second travel direction is greater than the first travel direction. A force provided by spring 62 moves head portion 58 back to a rest position from second position 74 or third position 76.

Latch 54 of connector handle 18 includes a hook portion 70 and an engaging portion 72 opposite hook portion 70 that engages with actuator button 56. Latch 54 may be made of any solid material, such as metal or wood. Preferably, latch 54 is made of a dielectric material that is a plastic material. Latch 54 is disposed in passage 40 in connector handle 18 being secured to connector handle 18 with a fastener 69. Fastener 69 may be a screw or rivet, and the like. Latch 54 is also disposed in a rest position to engage a boss 77 in connector handle 18.

Latch 54 is in a neutral, or rest position when actuator button 56 does not engage latch 54 as best illustrated in FIGS. 3A and 3B. Boss 77 provides a resting point for a portion of latch 54 nearest actuator button 56 when latch is not engaged by head portion 58. Boss 77 also provides an anchor to stabilize latch 54 when latch 54 communicates with nib 82 of vehicle inlet connector 22 when connector handle 18 is connected to vehicle inlet connector 22. Depression of actuator button 56 into third position 76 engages a bottom surface 78 of head portion 58 adjacent extending portion 64 against latch 54 so as to move hook portion 70 away from a shoulder 71 on vehicle inlet connector 22 so that handle connector 42 is removable, or releasable from vehicle inlet connector 22.

Referring to FIGS. 3-6, the electric circuit 48 may be a first circuit design 79 that includes a Hall effect sensor 80. The electric circuit 48 and the Hall effect sensor 80 operate according to the truth table shown in FIG. 7A-&C. The primary output resistance shows the resistance states of electrical connection 52 as shown in FIGS. 5 and 7A-7C, and is the resistance as measured between electrical connection 52 and ground when looking into electrical connection 52 from vehicle 14. Hall effect sensor 80 is disposed in an integrated circuit package that is mounted on PCB 81 along with associated other circuitry to produce electrical connection 52. The associated other circuitry on PCB 81 may include resistors, capacitors, inductors, diodes, and the like. The Hall effect sensor 80 and other associated circuitry may be attached to PCB 81 by soldering. PCB 81 is disposed in passage 40 of connector handle 18. PCB 81 may be secured to connector handle 18 in passage 40 using any suitable fastener. Preferably, circuit board 81 is secured in passage 40 of connector handle 18 using screws. Hall effect sensor 80 (U1) is positioned on circuit board 81 and circuit board 81 has an orientation in handle housing 34 so that Hall effect sensor 80 (U1) proximate to magnet 66 on actuator button 56 that overlies Hall effect sensor 80 (U1) when actuator button 56 is in first position 73 as best shown in FIG. 3A. When magnet 66 overlies Hall effect sensor 80 (U1) a sufficient amount of magnetic flux radiates into Hall effect sensor 80 that results in proximity output, or electrical connection 52 having a first output state when handle connector 42 is mated with vehicle inlet connector 22. A suitable hall effect sensor is commercially available from Allegro Microsystems, Incorporated under the trade designation Omnipolar Hall-Effect Digital Switches. A DC voltage power line 47 is supplied by charging station 16 to PCB 81 of connector handle 18 to operate first circuit design 79 and supply voltage to power Hall effect sensor 80 and a lamp 75. Lamp 75 may need to operate even if connector handle 18 is not connected to vehicle inlet connector 22. DC voltage power line 47 may be a 5 VDC electrical signal. Alternately, the DC voltage power line may have a voltage level different from 5 VDC. First circuit design 79 is grounded to charging station 16 through ground 49. Ground 49 may be connected with the battery charging system and the battery charging system ground may be an earth ground. Alternately, the grounds between the charging system and the vehicle may have a common ground being the chassis ground of the vehicle. The chassis ground may be earth ground.

Lamp 75 is useful to provide light that emits through passage 40 and out from an aperture (not shown) in connector means 42 in connector handle 18 to illuminate a dark environment to locate vehicle inlet connector 22. Lamp 75 is a light emitting diode 83 (LED1). Alternately, lamp 75 may be any element or device that emits light such as an incandescent bulb. A light pipe 84 focuses and transmits the light provided by diode 83 (LED1) thru passage 40 and out aperture in connector handle 18. Light pipe 84 may be secured in passage 40 by any suitable fastener, such as adhesive. Alternately, the lamp may not be employed in the handle.

A thermal cutout device 85 (F1) is disposed on PCB 81 in connector handle 18 and is suitable to sense if an over-temperature condition exists at least in connector handle 18 which encompasses an environment about thermal device 85. This environment may further extend out to include vehicle inlet connector 22 when connector handle 18 is connected with vehicle inlet connector 22. For example, an over-temperature condition may be experienced if a hot thermal failure develops in the handle when the handle is connected to vehicle inlet connector 22. If thermal device 85 (F1) is activated due to an over-temperature event, device 85 determines the output state of electrical connection 52 as shown in truth table 167 in FIG. 7C. Device 85 cuts out, or opens to determine the primary output resistance of electrical connection 52 to a high resistance state so charge controller 89 of vehicle 14 stops transmission of power signals 28 through connector handle 18. Advantageously, this feature may prevent connector handle 18 from becoming undesirably hot, emit a burning odor, or becoming deformed due to the over-temperature condition. Preferably, device 85 is tripped, or activated to be cut-out when a temperature sensed by thermal device 85 exceeds 105 degrees Celsius (° C.)±5° C. A suitable thermal shutdown device is commercially available from Cantherm under the trade designation Thermal Cutouts. If the over-temperature condition is induced due to a vehicle side thermal failure, thermal device 85 is resettable to allow connector handle 18 of battery charger 10 to recover from the vehicle-induced thermal failure. For example, device 85 is recoverable when the temperature of device 85 is sensed to be about 70° C., which is about 35° C. below the 105° C. threshold. Preferably, thermal device 85 is strategically positioned in connector handle 18 intermediate two power signals 28 disposed within connector handle 18. Thermal device 85 is configured to be in physical contact with the wire insulation of both wire conductors 28 carrying power signals to achieve the best response time in sensing an over-temperature condition permeating through the wire conductors 28 carrying power signals. Alternately, the thermal cutout device may not be employed in the handle.

When handle connector 42 of connector handle 18 is not connected with vehicle inlet connector 22, charging of battery 12 of vehicle 14 will not occur. Referring to FIG. 7A-C, reference numeral 164 shows various states of operation associated with electric circuit 48 in combination with activator 50 when connector handle 18 is not connected to vehicle inlet connector 22. If head portion 58 of actuator button 56 is depressed by the operator to at least second position 74, LED 83 emits light through the aperture in connector handle 18 to provide light in a darkened environment to locate vehicle inlet connector 22. LED 83 will stay on when head portion 58 is depressed past second position 74 and also stays on when in third position 76. The other operation states operate as shown in reference numeral 164, but are irrelevant as connector handle 18 is not connected to vehicle inlet connector 22.

Figure 6:
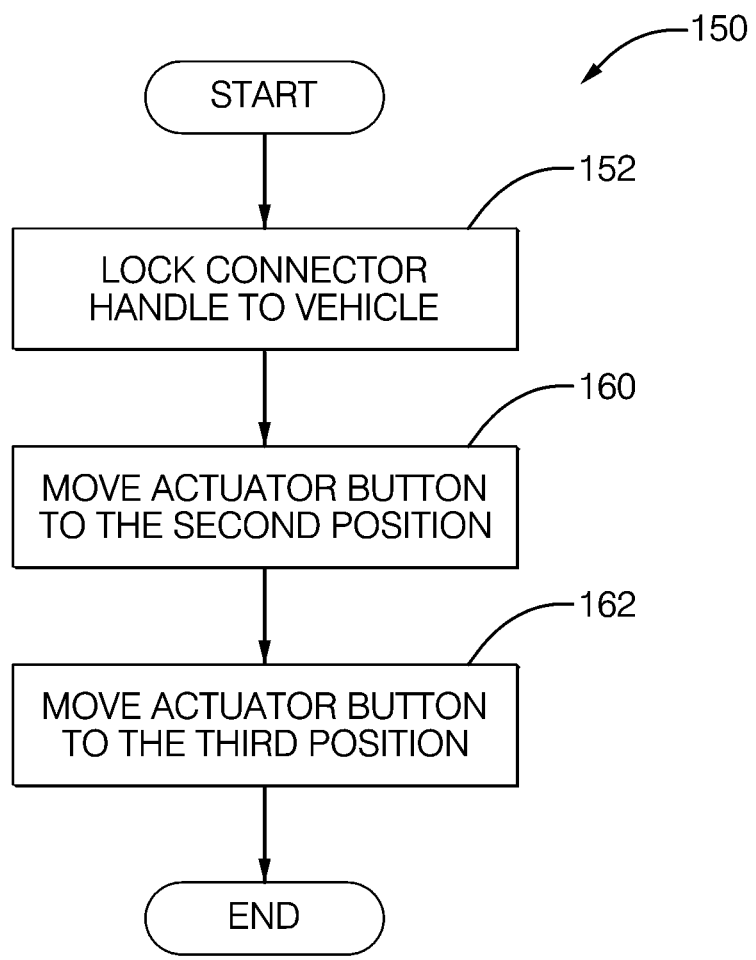
FIG. 6 is a block diagram of a method for connecting and disconnecting the connector handle.

Referring to FIGS. 3A-3C, 7A-7C, when charging station 16 is connected to the 120 VAC power source, and handle connector 42 is connected to vehicle inlet connector 22, and head portion 58 is in first position 73, charging of battery 12 of vehicle 14 may commence. Referring to FIGS. 6 and 7, method 150 is presented to control electrical charging of battery 12 and reference numeral 165 shows the various states associated with electric circuit 48 in combination with activator 50 when connector handle 18 is being mated to vehicle inlet connector 22. One step 152 in method 100 is to connect connector handle 18 to vehicle inlet connector 22 that passively connects latch 54 with vehicle inlet connector 22. The operator of battery charger 10 grasps connector handle 18 and moves connector handle 18 towards vehicle inlet connector 22. When vehicle inlet connector 22 is located by the operator, handle connector 42 of connector handle 18 is mated to vehicle inlet connector 22. Hook portion 70 of latch 54 rides over nib 82 with insertion of handle connector 42 to engage shoulder 71 of vehicle inlet connector 22. Nib 82 includes a ramp portion that transitions into the outer surface of vehicle inlet connector 22. Engagement of hook portion 70 against shoulder 71 prevents inadvertent removal of connector handle 18 from vehicle inlet connector 22. This secures latch 54 to vehicle inlet connector 22 in a locked state. When connector handle 18 is mated to vehicle inlet connector 22 the supply voltage for electrical connection 52 is provided by vehicle 14. Terminals (not shown) in handle connector 42 are in electrical communication with corresponding terminals (not shown) in vehicle inlet connector 22 before hook portion 70 engages shoulder 71. For example, the hook portion may engage the shoulder after about 1 millimeter of travel past where the terminals of the handle connector and the terminals of the vehicle inlet connectors are connected. When handle connector 42 is electrically connected with vehicle inlet connector 22, wire conductors 28 carrying power signals are provided for transmission through connector handle 18 to electrically charge battery 12 on vehicle 14.

When connector handle 18 is mated to vehicle inlet connector 22 and head portion 58 is in first position 73 and actuator button 56 is not depressed, electrical connection 52 is at a low resistance state looking into electrical connection 52 as seen by vehicle 14. Magnet 66 is overlying Hall effect sensor 80 supplying magnetic flux to Hall effect sensor 80 to ensure first circuit design 79 keeps electrical connection 52 in a low resistance state. When charge controller 89 of vehicle 14 senses the low resistance state of electrical connection 52, charge controller 89 communicates with charging battery charger 10 to transmit at least one power signal on wire conductor 28 through connector handle 18 to charge battery 12 in vehicle 14.

When the operator desires to disconnect battery charger 10 by uncoupling connector handle 18 from vehicle inlet connector 22, the operator depresses head portion 58 of actuator button 56 to third position 76 which is step 162 in method 150. This may occur, for example, when battery 12 has been completely electrically charged and has a full electrical charge. When battery 12 has a full electrical charge, battery charger 10 is no longer needed. Third position 76 cannot be attained until dual-mode push button is induced, or moved initially through second position 74. The depression of head portion 58 to second position 74 is defined as a partial depress of head portion 58, as captured in step 160 of method 150. The depression of head portion 58 to third position 76 is defined as a complete depress of head portion 58. When head portion 58 is induced to second position 74, magnet 66 travels away from Hall effect sensor 80. Magnetic flux no longer influences hall Hall effect sensor 80 and the performance of first circuit design 79 operates to change the electrical state of electrical connection 52 to a high resistance state. Charge controller 89 in vehicle 14 senses the high resistance state of electrical connection 52 and configures battery charger 10 to stop transmission of one or more power signals 28 through connector handle 18. When wire conductors 28 carrying power signals are not transmitted, battery 12 is not being electrically charged. In second position 74, latch 54 is still in the locked state and connector handle 18 is not releasable from vehicle inlet connector 22. When head portion 58 is depressed to third position 76, surface 78 of head portion 58 engages latch 54 to move latch 54 to a position that is outwardly away from shoulder 71 of vehicle inlet connector 22 so that hook portion 70 of latch 54 is clear of shoulder 71. When latch 54 is clear of shoulder 71, handle connector 42 of connector handle 18 may be removeably uncoupled from vehicle inlet connector 22. Thus, the transmission of power signals on wire conductors 28, which is defined as a hot signal, is stopped before handle connector 42 of connector handle 18 is removable from vehicle inlet connector 22 to prevent connector handle 18 from being removed while battery 12 is still being charged. This feature enhances the safety to the operator that uses battery charger 10. If the battery continued to be electrically charged while the handle is also being disconnected from the vehicle inlet connection, undesired electrical arcing across the terminals of the handle connector and vehicle inlet connection may result which may degrade these connections. Arcing may degrade these connections by causing material of terminals in these connections to break away resulting in high impedance in the connection which lowers the effective electrical conductivity in the connection.

Referring to FIGS. 5 and 7A-7C, and turning our attention to the operation of first circuit design 79, first circuit design 79 includes Hall effect sensor 80 (U1) that has four modes of circuit operation when handle connector 42 is mated to vehicle inlet connector 22. A first operation state occurs when head portion 58 of actuator button 56 is in first position 73, or not depressed and thermal device 85 (F1) does not sense an over-temperature condition in connector handle 18. A second operation state occurs when head portion 58 is depressed to second position 74 and thermal device 85 (F1) does not sense an over-temperature condition. A third operation state occurs when head portion 58 is depressed to third position 76. A forth operation mode occurs when thermal device 85 (F1) senses an over-temperature condition in connector handle 18.

Figure 5:
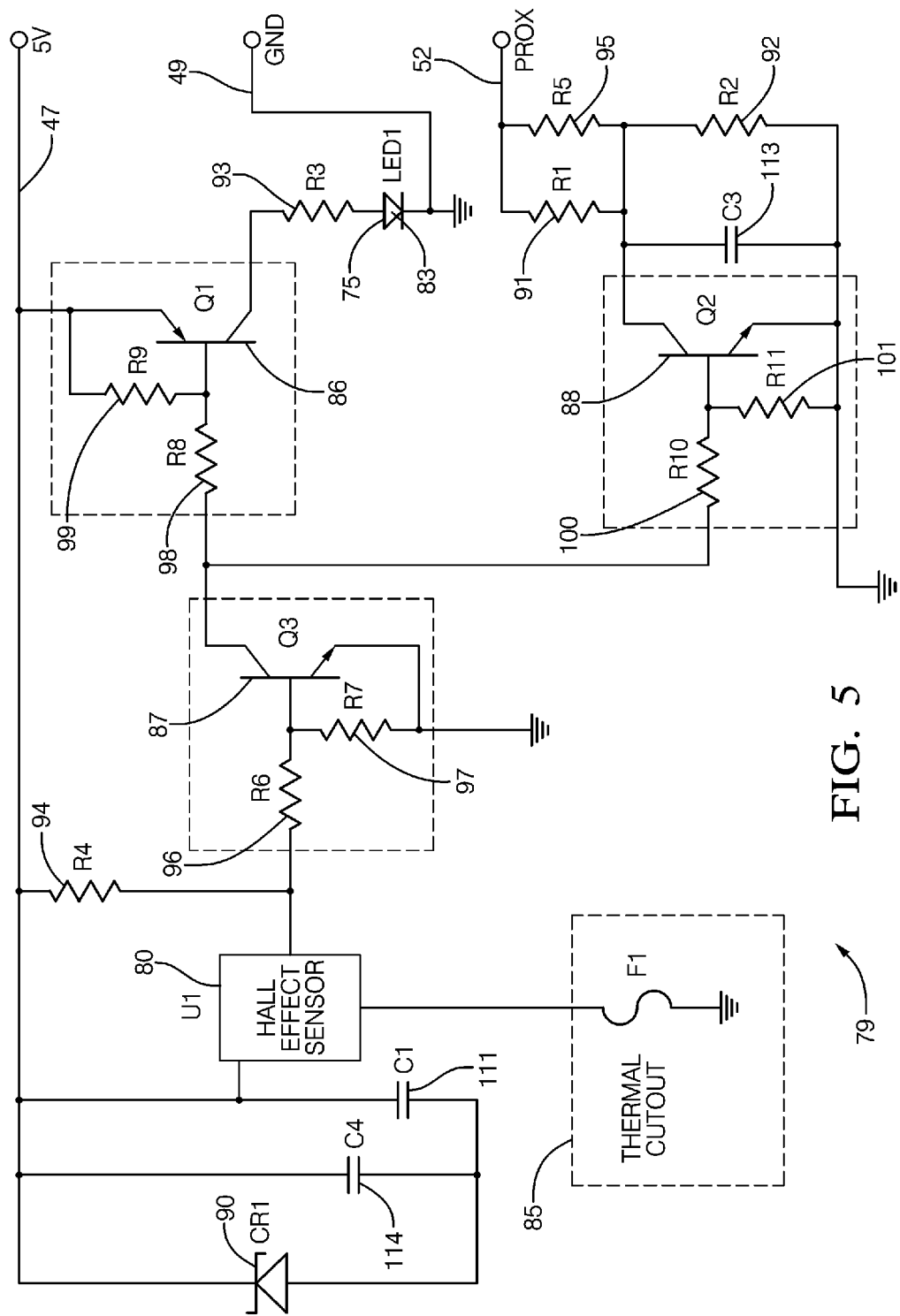
FIG. 5 is an electric circuit schematic diagram of a first alternative design for an electric circuit of the connector handle.

Referring to FIG. 5, thermal device 85 (F1) is electrically connected to Hall effect sensor 80 (U1) and diode 83 (LED1) is in electrical communication with Hall effect sensor 80 (U1) through electronic transistor devices 86 (Q1), 87 (Q3). Transistor 86 (Q1) provides the necessary current to operate diode 83 (LED1) when transistor 86 (Q1) is turned on. Transistor 87 (Q3) provides a buffer between the output of Hall effect sensor 80 (U1) and transistor driver 87 (Q3). Electrical switching device, or transistor device 88 (Q2) is in electrical communication with Hall effect sensor 80 (U1) and with vehicle inlet connector 22 through PROX line, or electrical connection 52, to charge controller 89 in vehicle 14. Voltage suppressor 90 (TVS 1) is used to protect Hall effect sensor 80 (U1) from transient voltages that could be coupled onto the 5 VDC supply line by limiting the maximum voltage that may be applied to Hall effect sensor 80 (U1). Resistors 91-101 are used to provide proper biasing levels for respective transistors 86-88 (Q1-Q3). Capacitors 111, 113-114 provide additional electrical filtering for electrical signals in first circuit design 79.

First Circuit Operation State—Hall-Effect Sensor

As previously described herein, the first state of operation using Hall effect sensor 80 (U1) is where thermal device 85 (F1) does not sense an over-temperature condition and head portion 58 of actuator button 56 is in first position 73. Referring to FIGS. 3A, 5, and 6, the first operation state includes electrical connection 52 (prox) being in a low resistive state. The low resistance state is attained when head portion 58 is in the rest position regardless of whether connector handle 18 is connected or not connected to vehicle inlet connector 22. Referring now to FIG. 3A, head portion 58 is not depressed so that magnet 66 is centered over Hall effect sensor 80 (U1). A threshold of magnet flux supplied to Hall effect sensor 80

(U1) ensures an output of Hall effect sensor 80 (U1) electrically connecting with transistor 87 (Q3) is at a low resistance state. This low resistance state is output to transistor 86 (Q1) turns transistor 87 (Q1) off which subsequently turns off transistor 87 (Q3). With transistors 86 (Q1), 87 (Q3) turned off, each transistor device has an open collector output. With transistor 87 (Q3) being turned off, diode 83 (LED1) is also turned off so no light emits from diode 83 (LED1) through aperture of handle connector 42 and out of connector handle 18. With transistors 86 (Q1) and 87 (Q3) being turned off, and the collector of transistor 87 (Q3) being pulled near the 5V supply, transistor 88 (Q2) is turned on and electrical connection 52 is at a low voltage level or ground voltage potential.

Second Circuit Operation State—Hall-Effect Sensor

Referring to FIG. 3B and step 160 of method 150 in FIG. 6, the second operation state is attained when the operator activates, or depresses head portion 58 of actuator button 56 to a partially induced position, or second position 74. Thermal device 85 (F1) does not sense an over-temperature condition in connector handle 18 and electrical connection 52 is in a high resistive state. When actuator button 56 is depressed to second position 74, magnet 66 moves away from Hall effect sensor 80 (U1). Magnetic flux decreases such that the output of Hall effect sensor 80 (U1) is electrically changed to be an open circuit having high impedance. With the output of Hall effect sensor 80 (U1) being an open circuit, the voltage on transistor 87 (Q3) is pulled up near the 5 VDC supply voltage turning transistor 87 (Q3) on, which effectively puts the collector of transistor 87 (Q3) at ground voltage potential. With transistor 87 (Q3) turned on, transistor 87 (Q3 becomes saturated allowing the collector of transistor 87 (Q3) to be pulled near the 5V supply voltage and transistor 86 (Q1) to be turned on allowing current flow through transistor 87 (Q3) to supply current to diode 83 (LED1) so that diode 83 (LED1) turns on. Light from diode 83 (LED1) is provided through lightpipe 84 and emits out from aperture of connector handle 18 illuminating an area beyond the aperture of connector handle 18 in a dark environment to assist the operator to locate vehicle inlet connector 22. With transistors 86 (Q1) and 87 (Q3) being turned on, and the collector of transistor 87 (Q3) being pulled near the ground voltage potential, transistor 88 (Q2) is turned off and electrical connection 52 attains a high resistance state. The high resistance state is sensed by charge controller 89 in vehicle 14 and charge controller 89 electrically communicates with charging station 16 through other wire conductors 24 in connector handle 18 to transmit power signal on wire conductor 28 to charge battery 12 of vehicle 14.

Third Circuit Operation State—Hall-Effect Sensor

In a third state of operation of hall-effect sensor U1, head portion 58 is completely depressed, or depressed into third position 76. The high resistance state of electrical connection 52 is maintained as magnet 66 is even further removed from Hall effect sensor 80. In third position 76, head portion 58 engages latch 54. The cantilever action of the latch 54 causes hook portion 70 of latch 54 to move out and away from vehicle inlet connector 22 and allow handle connector 42 to be removed from vehicle inlet connector 22. As previously discussed herein, when actuator button 56 is depressed to at least second position 74, light emitting diode 83 (LED1) is activated. Diode 83 (LED1) also stays on if head portion 58 is disposed between second position 74 and third position 76 or if actuator button 56 is in third position 76.

Fourth Circuit Operation State—Hall-Effect Sensor

In a fourth state of operation, thermal device 85 (F1) senses on over-temperature condition in connector handle 18 and configures electrical connection 52 in a high resistive state. Thermal device 85 cuts out, or breaks when the temperature in handle exceeds 105 degrees Celsius. The other elements associated with electric circuit 48 and activator 50 are 'don't care' or irrelevant as illustrated by reference numeral 167 in FIG. 7C. Thermal device 85 ensures electrical connection 52 is configured to the high resistive state that ensures transmission of power signals on wire conductors 28 are stopped. This provides enhances safety to the operator of connector handle 18 of battery charger 10. If the power signals transmit electrical energy when an over-temperature condition occurs device 85 essentially mitigates overheating that may occur in connector handle 18 if the contact resistance between the power terminals attached to wire conductors 28 carrying of power signals of handle connector 42 and vehicle inlet connector 22 increased for any reason, such as if undesired dirt or debris gets trapped between this terminals. If the power signals are not shut down, a constant current would continue to be supplied through this increased resistance that eventually results in undesired deformation of the terminal contacts of wire conductors 28 carrying power signals. If the deformation is severe, electrical conductivity may not occur.

Figure 8:
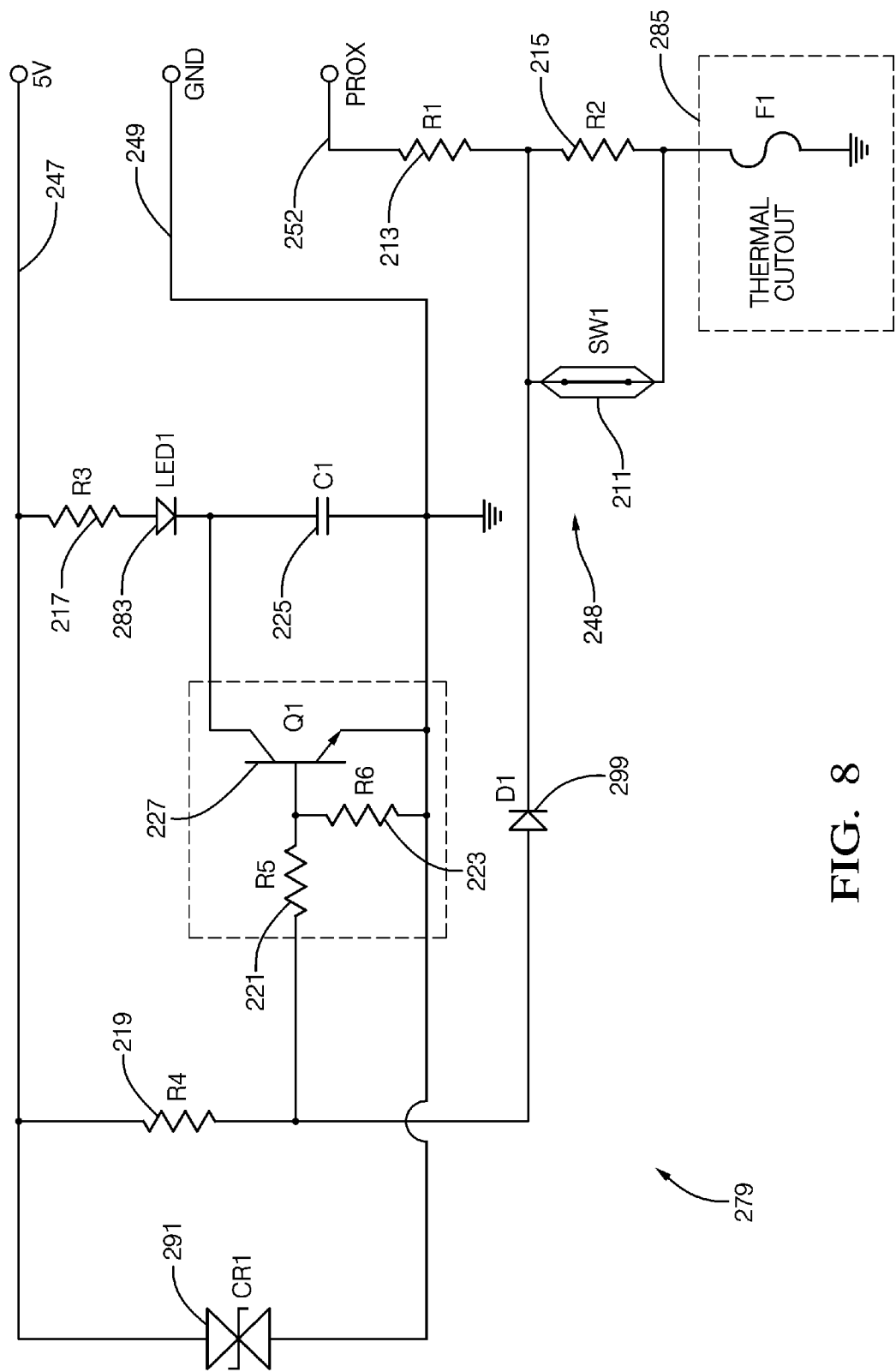
FIG. 8 is an electric circuit schematic diagram of a second alternative design for the electric circuit.

Referring to FIG. 8, a second circuit design 279 for the electric circuit 48 is shown. A reed switch 211 (SW1) is used in combination with an activator (not shown) that manages, or controls an electrical connection 252 independently from unsecuring the handle connector (not shown) from the vehicle inlet connection (not shown). Reed switch 211 (SW1) is a magnetically activated switch. The activator is a dual-mode push button similar to the dual-mode push button of the embodiment of FIGS. 2-7, and is previously described herein. The truth table for the embodiment of FIG. 8 may be similar to that of the embodiment of FIGS. 2-7, as previously described herein, and as shown in FIGS. 7A-7C. The reed switch interacts with the magnet associated with the dual-mode push button, similar to the embodiment of FIGS. 2-7. The alternate embodiment of FIG. 8 is also similar to the embodiment of FIG. 5 that includes the hall-effect sensor in that there are four modes of operation when the handle connector is mated to vehicle inlet connector. A first operation state occurs when reed switch 211 (SW1) is in a normally closed position as illustrated in FIG. 8. When the dual-mode pushbutton of the embodiment of FIGS. 2-7 is not depressed by the operator of the charging system the dual-mode pushbutton is in a rest position and reed switch 211 (SW1) is in a normally closed position as illustrated in FIG. 8. Thermal device 285 (F1) does not sense an over-temperature condition in the charge coupling handle. A second operation state occurs when the dual-mode pushbutton is depressed to first depress position (not shown) and thermal device 285 (F1) does not sense an over-temperature condition in the charge coupling handle. A third state of operation is when the dual-mode push button is depressed into the second depress position (not shown) and thermal device 285 (F1) does not sense an over-temperature condition in the charge coupling handle. A fourth operation mode occurs when thermal device 285 (F1) does sense an over-temperature condition in the charge coupling handle. Voltage suppressor 291 (TVS 1) is used to limit the supply voltage supplied from vehicle 14 to 5V. Resistors 213, 215, 217, 219, 221, 226 are used to provide proper biasing levels for transistor 287 (Q1), 283 (LED1) and electrical connection 252. Capacitor 225 provides additional filtering for signals in second circuit design 279. A DC voltage supply line 247 assists to supply operating voltage for second circuit design 279. Power line 247 may supply voltage for diode 283 (LED1) disposed on a printed circuit board (not shown) in the charge coupling handle. Power line 247 is supplied from the charging station (not shown). Second circuit design 279 is grounded to charging station through ground 249. The ground 249 is similar to ground 49 in the embodiment of FIGS. 2-7.

First State of Operation—Reed Switch

The first state of operation uses reed switch 211 (SW1) where thermal device 285 (F1) does not sense an over-temperature condition. Referring again to FIG. 8, the first operation state includes electrical connection 252 (prox) being in a low resistive state with thermal device 285 (F1) being closed. Preferably, the low resistance state between electrical connection 252 and ground voltage potential is about 150 ohms. The head portion (not shown) of the dual-mode push button (not shown) is not depressed so that a sufficient amount of magnet flux is applied to reed switch 211 (SW1) from the magnet (not shown) to keep reed switch 211 (SW1) in a normally closed position, as illustrated in FIG. 8, keeping electrical connection 252 at a low impedance state. As shown in FIG. 8, electrical connection 252 is at about ground voltage potential. Transistor 227 (Q1) is turned off with the base of transistor 227 (Q1) being at a voltage above the voltage drop across diode 299 (D1). With transistor 227 (Q1) off the current flow through diode 283 (LED1) is minimal and diode 283 (LED1) is turned off. With diode 283 (LED1) turned off, no light is provided through the charge couple handle.

Second State of Operation—Reed Switch

Thermal device 285 (F1) does not sense an over-temperature condition in the charge coupling handle and electrical connection 252 is in a high resistive state. Preferably, the high resistance state between electrical connection 252 and ground voltage potential may be a resistance of about 480 ohms. When the head portion of the dual-mode push button is depressed to first depress position, the magnet moves away from reed switch 211 so that the magnetic flux applied to reed switch 211 decreases. Reed switch 211 now switches to an open position allowing current to flow through resistors 213 (R1), 215 (R2). The voltage increases at the base of transistor 227 (Q1) sufficiently to turn transistor 227 (Q1) on. Turning 227 (Q1) on, allows current to flow through resistor 217 (R3) and diode 283 (LED1) to turn on diode 283 (LED1) and provide light emitting through the charge couple handle. Electrical connection 252 transitions to a high resistance state.

Third State of Operation—Reed Switch

In a third state of operation, the dual-mode push button is depressed to a second depress position. In the second depress position, the dual-mode push button engages the latch similar to the embodiment of FIGS. 2-7.

Forth State of Operation—Reed Switch

A fourth state of operation, thermal device 285 (F1) does sense an over-temperature condition in the charge coupling handle. When device 285 (F1) senses an over-temperature condition, device 285 (F1) breaks, or cuts out. When device 285 (F1) cuts out, electrical connection 252 is configured to a high impedance state. Preferably, the high impedance state is a high resistance state between electrical connection 252 and ground voltage potential. The resistance in the high resistance state may be about 1 Megaohm.

If second circuit design 279 is employed without using diode 283 (LED1), a wire conductor, typically, a 16 AWG sized wire, in the bundle of wire conductors received from the charging station to the charge couple handle may be eliminated that decreases the cost of manufacture of the charging system. When diode 283 (LED1) is not used a DC power line 247 received from the charging station to the printed circuit board is not needed. Electrical connection 252 is supplied power from the vehicle similar to the embodiment of FIGS. 2-7. Reed switch 211 (SW1) does not require electrical power to operate since it operates on magnetic energy, which is to say the contacts of reed switch 211 (SW1) are open and closed magnetically dependent on the magnet position where the magnet position is determined by the state of the push button.

Figure 1:
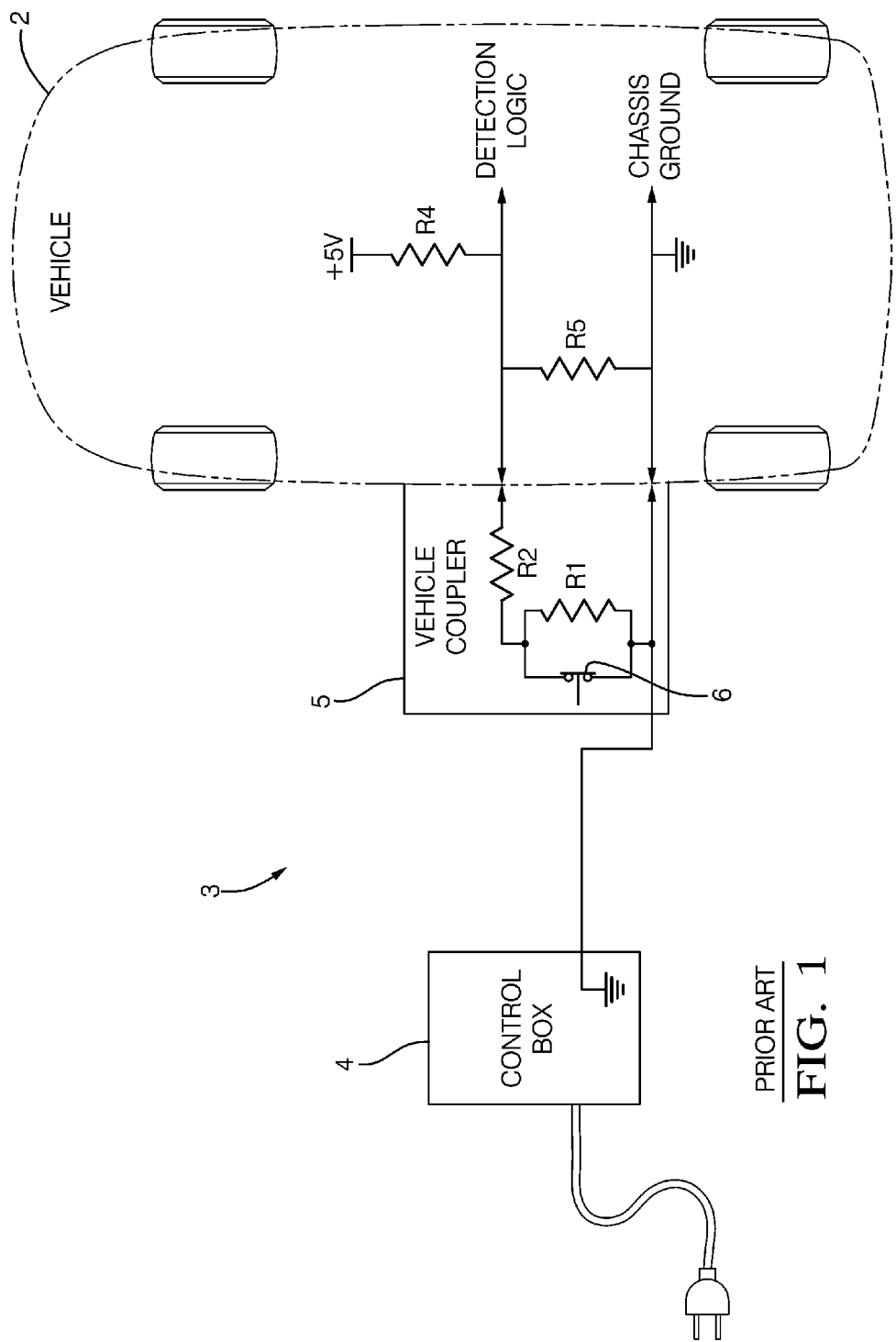
FIG. 1 is a prior art electric circuit for providing an output signal to facilitate electrical charging of a battery of a vehicle.

First circuit design 79 and second circuit design 279 are solid-state electrical circuits having non-contact electrical switches, respectively, where the non-contact electrical switches do not have moving mechanical parts or contact wear as does the mechanical switch in the prior art of FIG. 1. Each non-contact switch is resistant to environmental effects, such as dust, dirt, and water. Alternately, snap action microswitches may be used as the non-contact electrical switch. However, the microswitches preferably need to be sealed against undesired environmental effects, such as dirt and water, to ensure a robust design. Sealing of the microswitches adds additional undesired cost.

Alternately, what is described herein should not be limited, rather any charging system that includes electrical circuits, techniques, or methods that allow the electrical connection to be managed, or controlled independent from the unsecuring of the handle connector, preferably so the transmission of the power signals are stopped before the handle connector of the handle is releasable from the vehicle inlet connection is within the spirit and scope of the invention as described herein.

In another alternate embodiment, the bipolar devices in the hall-effect and reed circuits may include other types of electronic switch devices, such as FETS, MOSFETS, and the like.

Alternately, the resistance output states at the electrical connection may be voltage or current levels that establish different types of output states. Yet alternately, the logic levels may be edge-triggered output configurations that establish a difference between to operational output states. Still yet alternately, the electrical connection may be electrically manipulated in any possible way to establish a difference in an operational characteristic of the electrical connection.

Alternately, the activator may be a pull-lever mechanism, such as is similar to that found on a typical gasoline pump that allows displacement of the magnet away from the switch. Still yet alternately, any mechanism that allows displacement of the magnet away from the switch is covered by the spirit and scope of the invention.

Still yet alternately, the electrical output to the vehicle inlet connection may be supplied with voltage resident in the handle and supplied from the charging station.

Alternately, the vehicle inlet connection may also be included in the charging system. This ensures that a provision on the shoulder more easily communicates with the securing mechanism when the handle connector is connected to the vehicle inlet connection. Should the provision be different than that required by the securing mechanism undesired difficulty may arise connecting and unconnecting the handle connector where recharging the battery may not occur.

Alternately, the system may be used to supply power signals to supply electric charge to a battery such as a marine battery, truck battery, and the like.

Still yet alternately, other motorized vehicles in the transportation may use the charging system as described herein if the SAE J-1772 standard is adopted by non-automotive industries to switch AC power to the load. The SAE J-1772 standard is an automotive industry standard and an on-board vehicle charger is the electrical load.

Thus, a reliable charging system to charge a battery on an electric vehicle has been provided. The handle includes a mechanical latch that securely mechanically locks the handle to the vehicle passively when the handle is manually attached to the vehicle by a human operator to create an electrical connection between the vehicle and the charger. The handle has an actuator movable by the operator from a deactivated state to a first and a second position activated state where the mechanical latch operates independently of the state of the actuator when the handle is being manually attached but being mechanically released by the actuator when it is moved to its second activated state. A non-contact electrical switch means associated with the actuator breaks the electrical connection when the actuator is moved to the first position activated state before releasing the mechanical latch at the second activated position. A dual-activation push button includes a magnet that works in combination with the non-contact switch means where the non-contact switch means is a hall-effect sensor to operatively determine resistance operational states of the electrical connection. The dual-activation push button and magnet may also be combined with a reed switch to provide the similar beneficial features. An ergonomically designed handle is easily grasped by the operator of the handle to connect the handle to the vehicle inlet connection. The hall-effect sensor or reed switch is strategically located in passage of a handle on a printed circuit board to allow magnetic flux interaction with the magnet disposed on an extendable portion of a dual-mode push button. The handle may include a lamp that is activated with at least partial activation of the push-button to provide light to accurately locate the vehicle inlet connection in a dark environment for connection of the handle to the vehicle inlet connection. A thermal shutdown cutout device senses for an over-temperature event in the handle and alters the electrical connection to a high resistance state to electrically break the electrical connection during a sensed over temperature event. The high resistance state, as seen by the vehicle, prevents transmission of current on wire conductors carrying power signals through the handle for increased safety to the operator. A charging system powered by 120 VAC is constructed in a compact size that is suitable for storage in a trunk of the vehicle for remote use anywhere the vehicle travels as long as a 120 VAC power source is available when the battery needs to be electrically charged. The charging system any also be configured to be run off 240 VAC to charge the battery in a shorter time period in contrast with the charging station being connected to the 120 VAC power source.

While the present invention has been shown and described with reference to certain preferred embodiments thereof, it will be understood by those skilled in the art that various changes in form and details may be made therein without departing from the spirit and scope of the present invention as defined by the appended claims.

All terms used in the claims are intended to be given their broadest ordinary meanings and their reasonable constructions as understood by those skilled in the art unless an explicit indication to the contrary is made herein. In particular, use of the singular articles such as "a," "the," "said," . . . et cetera, should be read to recite one or more of the indicated elements unless a claim recites an explicit limitation to the contrary.

We claim:

1. A connector handle for an electric vehicle battery charger, said connector handle configured to electrically connect and mechanically lock the connector handle to an electric vehicle, said connector handle comprising:
 a latch operable to a locked position where the connector handle is locked to the vehicle and an unlocked position where the connector handle is not locked to the vehicle;
 an electric circuit configured to provide an enable indication that indicates that electrical power to charge a battery of the vehicle should be supplied to the connector handle and a disable indication that indicates electrical power should not be supplied to connector handle;
 an actuator button in operable communication with the latch and the electric circuit, wherein said actuator button is moveable to a) a first position where the latch is in the locked position and the electric circuit provides the enable indication, b) a second position where the latch is in the locked position and the electric circuit provides the disable indication, and c) a third position where the latch is in the unlocked position and the electric circuit provides the disable indication.

2. The connector handle in accordance with claim 1, wherein said actuator button passes through the second position when moved from the first position to the third position.

3. The connector handle of claim 1, wherein said enable indication is indicated by a first resistance value and said disable indication is indicated by a second resistance value distinct from the first resistance value.

4. The connector handle in accordance with claim 3, wherein said electric circuit includes a magnetic sensing device configured to change the first resistance value to the second resistance value when the actuator button is moved from the first position to the second position.

5. The connector handle in accordance with claim 4, wherein said magnetic sensing device is a Hall effect sensor.

6. The connector handle in accordance with claim 4, wherein said magnetic sensing device is a reed switch.

7. The connector handle in accordance with claim 1, wherein said actuator button remains in the first position while the connecting handle is being electrically connected and mechanically locked to the vehicle.

8. The connector handle in accordance with claim 1, wherein said electric circuit is further configured to provide an over-temperature indication that indicates the temperature of the connector handle has exceeded a threshold value.

9. The connector handle in accordance with claim 1, wherein the locked position is a singular position.

* * * * *